United States Patent [19]
Brown

[11] Patent Number: 4,605,151
[45] Date of Patent: Aug. 12, 1986

[54] CHUCK ASSEMBLY

[75] Inventor: Kenneth W. Brown, Cambridge, United Kingdom

[73] Assignee: The Welding Institute, Cambridge, England

[21] Appl. No.: 754,614

[22] Filed: Jul. 12, 1985

[30] Foreign Application Priority Data

Jul. 20, 1984 [GB] United Kingdom ............... 8418553
Jul. 20, 1984 [GB] United Kingdom ............... 8418554

[51] Int. Cl.⁴ .................... B23K 20/12; B23K 37/04
[52] U.S. Cl. .................................... 228/2; 228/44.5; 228/49.1
[58] Field of Search ............. 228/44.5, 2, 49.1, 49.4, 228/49.3; 279/1 DC, 1 DA

[56] References Cited

U.S. PATENT DOCUMENTS 3,820,231  6/1974  Sage .................................... 228/2
3,897,896  8/1975  Louw et al. ........................ 228/2

FOREIGN PATENT DOCUMENTS 0163003  3/1981  Japan ............................ 279/1 DC
1093632  12/1967  United Kingdom.
1267891  3/1972  United Kingdom.
1276863  6/1972  United Kingdom.
1460667  1/1977  United Kingdom.
1505832  3/1978  United Kingdom.

Primary Examiner—Nicholas P. Godici
Assistant Examiner—Karen Skillman
Attorney, Agent, or Firm—Martin Novack

[57] ABSTRACT

A chuck assembly (8) is described comprising a plurality of external jaws (103) arranged in an annular configuration; and a corresponding plurality of internal jaws (122) positioned within a pipe (13) in use with the internal and external jaws in alignment. The jaws (103,122) are radially movable towards each other to grip the pipe wall therebetween. Each jaw (103,122) includes a gripping portion comprising a recess (128) or projection (127) respectively which cooperate to assist the gripping of the pipe wall by the chuck assembly (8).

Examples of the use of these chuck assemblies in friction welding apparatus and pipeline construction apparatus are described.

18 Claims, 15 Drawing Figures

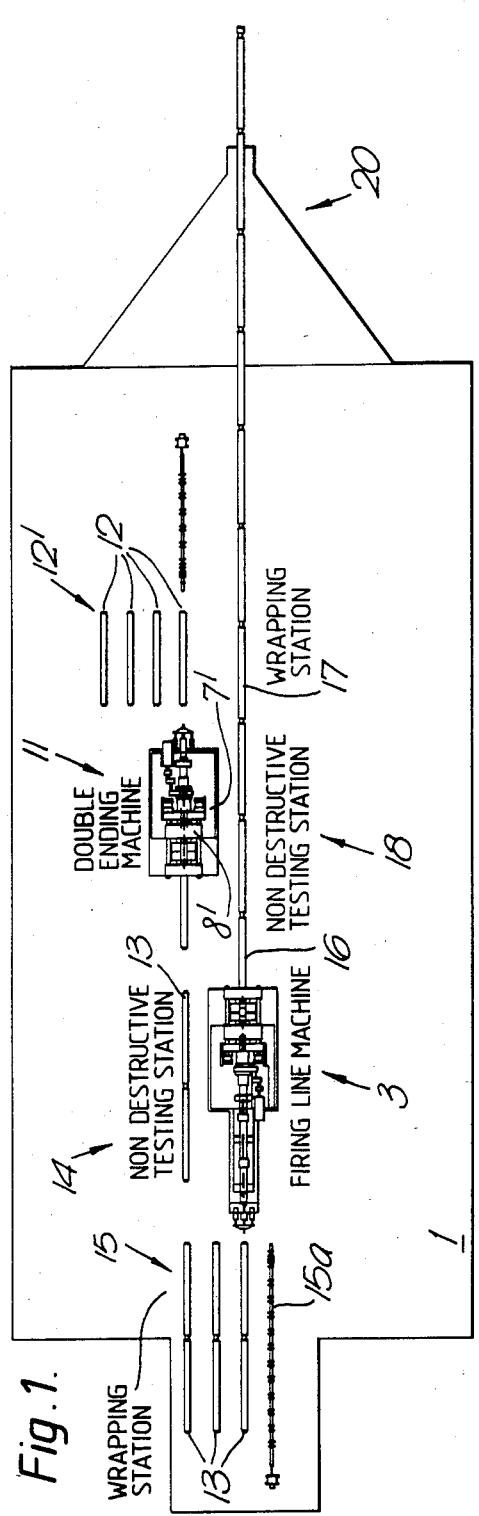
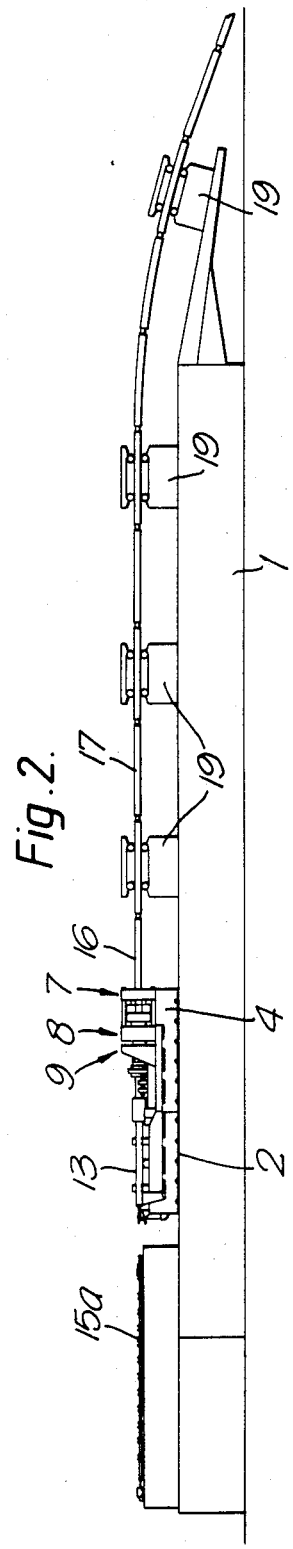

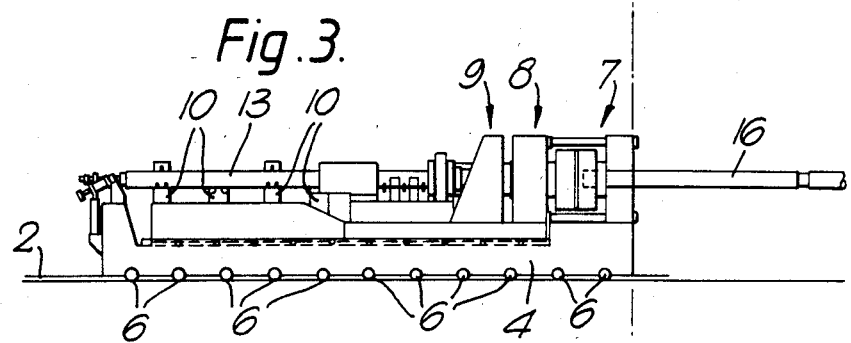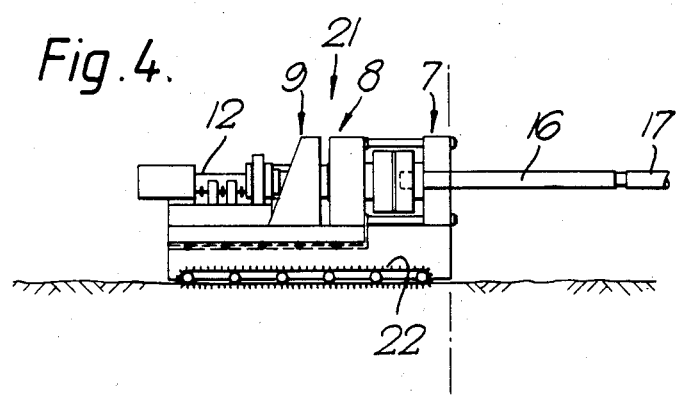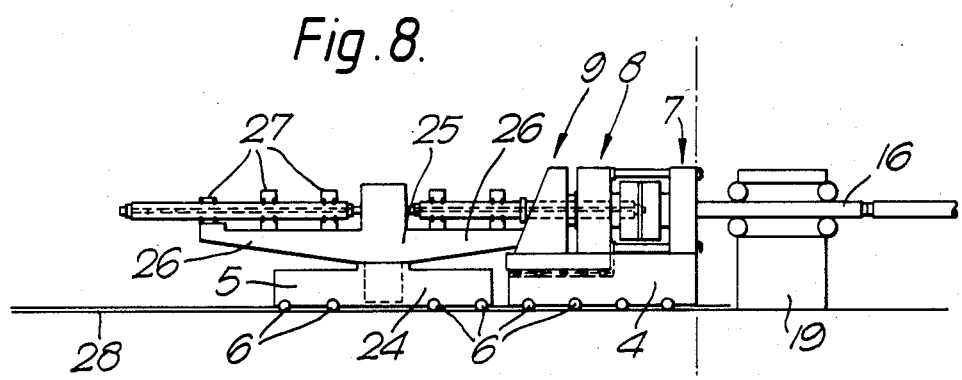

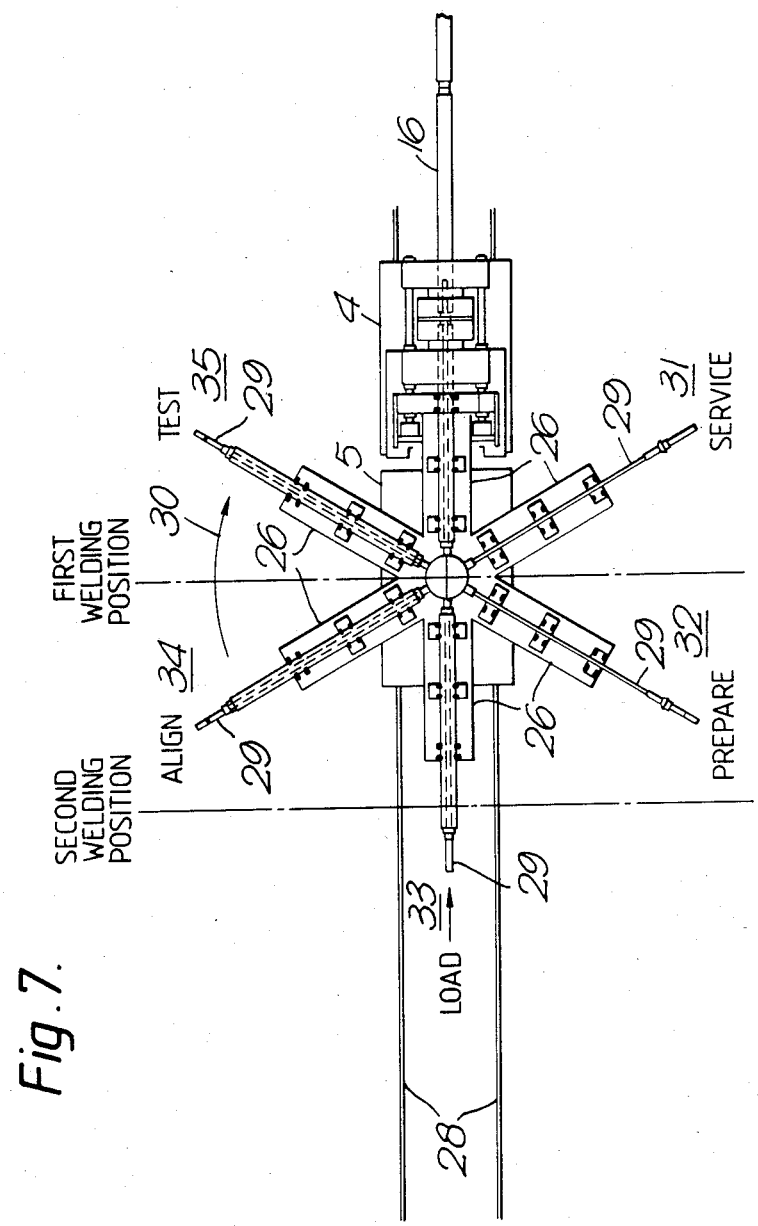

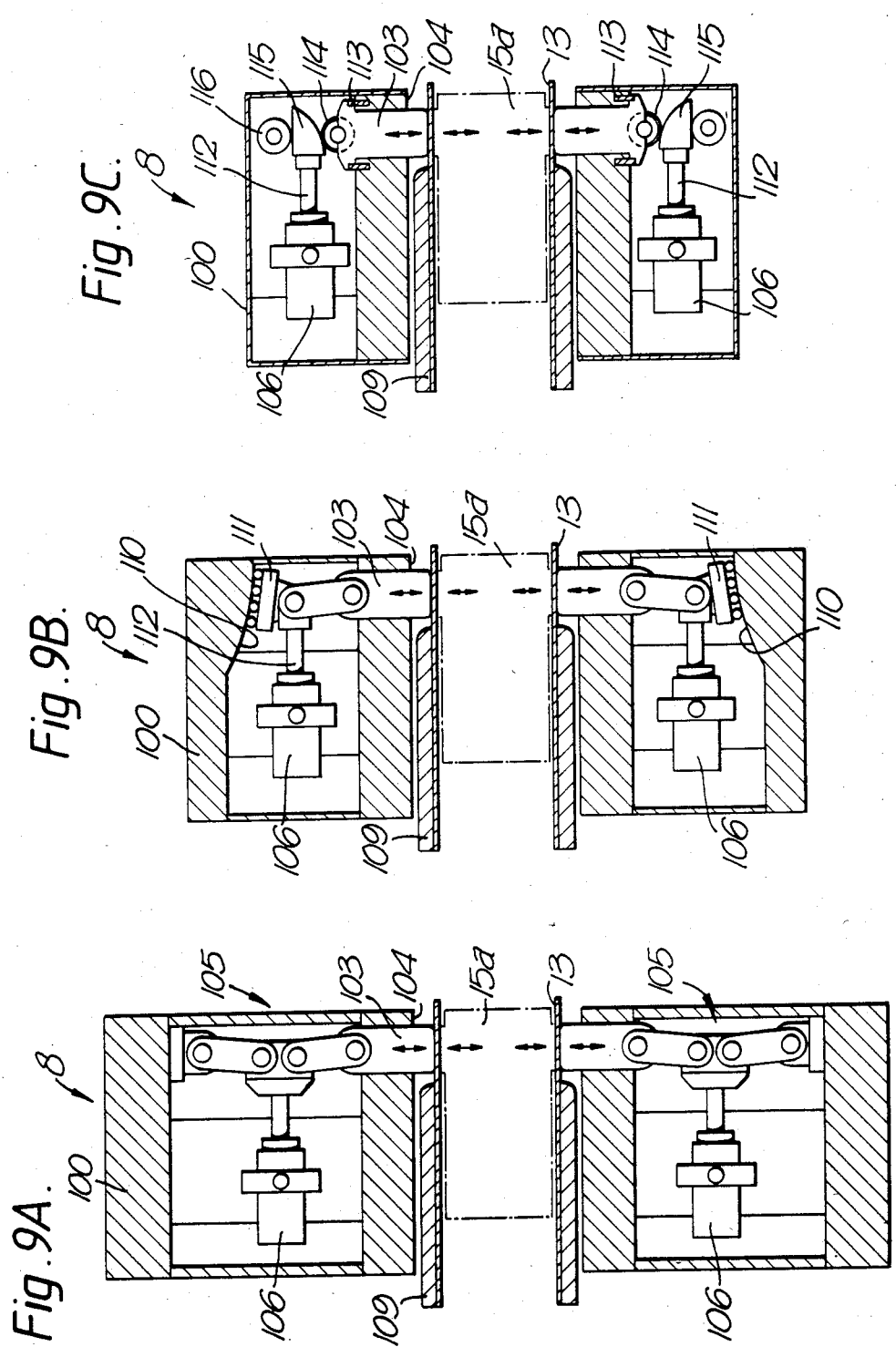

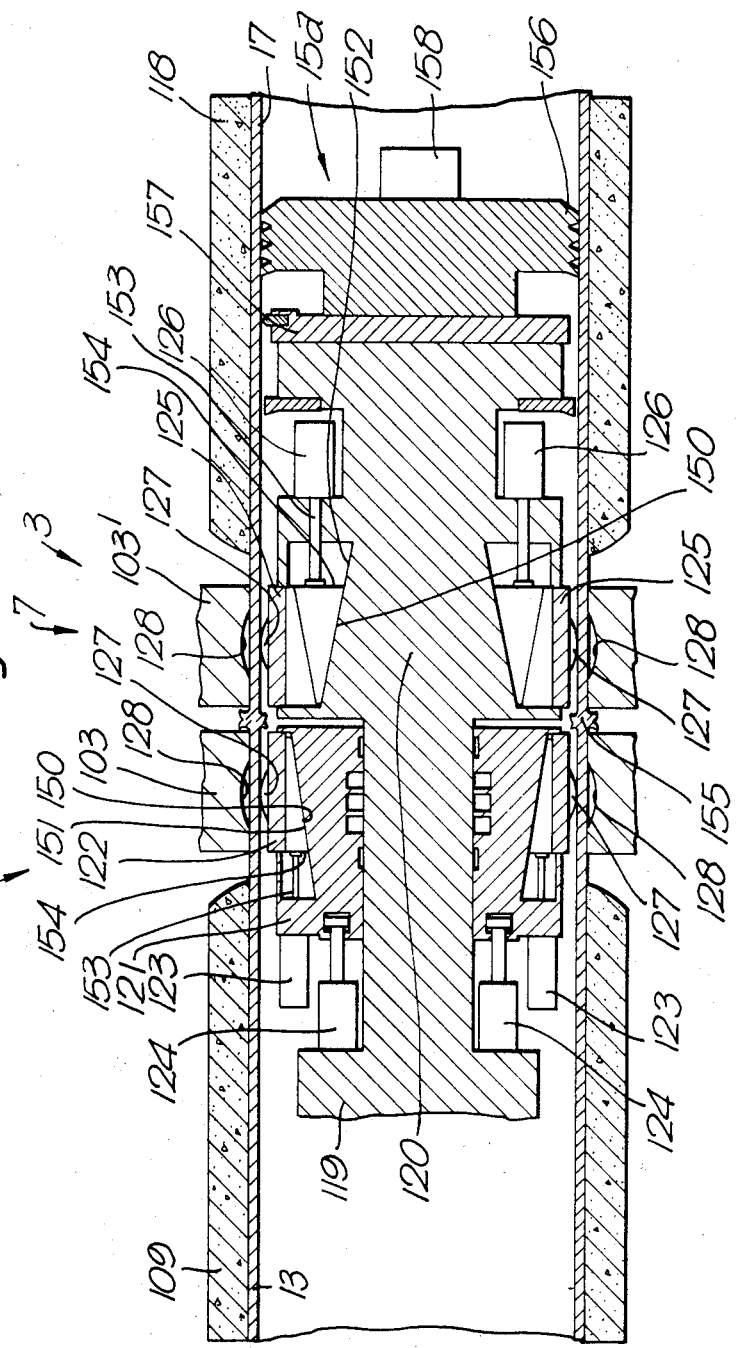

ARRANGEMENT OF TEST FOR DIMPLE CURVE. FRICTION TEST AS ABOVE BUT WITH NO INDENTATION.

CHUCK ASSEMBLY

The invention relates to a chuck assembly particularly for use in friction welding.

Friction welding is a comparatively recent industrial development but in view of its notional simplicity it is rapidly becoming important in certain mass production fields. In the friction welding process, two workpieces to be welded are initially rotated relatively to one another while in engagement and while being urged together and when sufficient heat has been built up, relative rotation is stopped while the work pieces continue to be forced together under a similar or an increased force to consolidate the weld.

One field where it would be desirable to use friction welding is that of pipeline fabrication particularly the field of offshore pipeline laying. The major problem in connecting pipe or tubular sections using friction welding is due to the difficulty of securely holding the pipe sections of nominally very low wall thickness to diameter ratio. Further difficulty arises in view of the large sizes of pipes concerned. For example, a typical pipe section will have a length of about 40 feet and a diameter of between 2 and 3 feet and, in the case of undersea pipelines, the pipe sections will be encased in concrete over a majority of their length. During friction welding, such pipe sections must be rotated at between 150 and 50 rpm and the final forging force will be in the order of 100 to 1000 tons for respectively 12" diameter (154 " wall) and 36" diameter (1" wall) pipes.

One recent proposal for holding a tubular pipe comprises a chuck assembly comprising a plurality of external jaws arranged in an annular configuration; and a corresponding plurality of internal jaws positioned within a pipe in use with the internal and external jaws in alignment wherein the jaws are radially movable relatively to one another to grip a pipe wall therebetween. Such a chuck assembly is hereinafter referred to as of the kind described.

Typically both the internal and external jaws are radially movable relatively to the remainder of the chuck assembly.

Chuck assemblies of the kind described have not been found to be satisfactory because a sufficient grip between the internal and external jaws has not been achieved and some slippage of the pipe has occurred while the pipe is gripped between the jaws.

In accordance with one aspect of the present invention, a chuck assembly of the kind described is characterised in that at least one of the internal and external jaws include a gripping portion comprising a projection or recess for cooperating iwth a corresponding recess or projection respectively in the wall of a pipe.

The use of cooperating projections and recesses in addition to the known jaw arrangement provides a significant improvement in reducing the occurrence of slippage.

Preferably, the gripping portion comprises a projection. With this arrangement if the cooperating jaw presents a face with a relatively large radius of curvature to the gripping portion there is less likelihood of the recess in the wall of the pipe being deformed.

It is preferably if at least all the internal or external jaws include gripping portions.

The or each gripping portion may comprise a projection presenting an inwardly facing planar surface for engagement with a flat formed in the pipe wall.

It is particularly convenient if one or more (preferably all) corresponding pairs of internal and external jaws include cooperating gripping portions. This allows pipes to be very securely held. In this case, the gripping portions may comprise a cooperating dimple and dome and in one example, each internal jaw is provided with a dome and each external jaw with a cooperating dimple. The advantage of a dome/dimple arrangement is that its symmetrical form means that substantial resistance is provided against both slippage in the circumferential direction and slippage in the axial direction. This is advantageous when the chuck assembly is used in a friction welding apparatus.

Typically, the internal jaws will be supported by a mandrel and in some examples, the external jaws and mandrel may be mounted onto the same housing. Conveniently, however, the mandrel is removable from the external jaws.

In some examples, the pipe will have a wall of uniform thickness. In these examples the pipe wall will be deflected during the gripping action and the size of the projections is chosen so that the degree of deflection of the pipe wall in use is kept within the elastic limit of the pipe wall so that on removal of the pipe from the chuck assembly the pipe wall returns to its original condition. Nevertheless plastic deformation is acceptable in some instances so long as the deformation does not exceed dimensions deleterious to pipe strength or efficacy of internal flow.

In other examples, the pipe wall may be plastically deformed prior to mounting in the chuck assembly, for example during manufacture to provide one or more gripping portions or projections/recesses for cooperation with gripping portion(s) on one or more of the jaws.

The chuck assemblies are suitable for use with metal and plastics pipes.

The invention is particularly applicable to friction welding apparatus which may comprise two chuck assemblies in accordance with the invention arranged in alignment with one another and supported by a housing, the chuck assemblies being rotatable relatively to one another whereby relative rotation between respective pipes supported by the chuck assemblies is achieved, at least one of the chuck assemblies being axially movable relatively to the other.

Where the internal jaws are supported by mandrels, conveniently each mandrel supports a plurality of jaw actuating blocks cooperating with the respective internal jaws and block actuating means, wherein the jaw actuating blocks cooperate with the mandrel and the jaws such that when the blocks are urged along the mandrel by the block actuating means, the blocks cause radial movement of the jaws.

Preferably, abutting surfaces of the blocks and mandrel are correspondingly tapered in the axial direction whereby axial movement of the blocks along the mandrel is accompanied by radial movement of the blocks.

Conveniently, the block actuating means comprises an hydraulic piston/cylinder arrangement and conveniently an hydraulic piston/cylinder arrangement is provided for each jaw actuating block.

Conveniently, the internal jaws of the two chuck assemblies for supporting the pipe section are mounted on relatively rotatable portions of a common mandrel. This increases stability of the system and also enables the pipe section to be rotated withn the chuck assemblies by enabling the mandrel to be easily rotated. For example, torque can be applied to a protruding portion of the mandrel within a trailing end of the pipe section, or it may be applied to the external jaws of either chuck assembly supporting the pipe section. Alternatively, where separate mandrels are used torque may be applied in any chosen combination to the respective mandrels and external jaws.

This friction welding apparatus is particularly applicable for use in pipeline fabrication. We provide furthermore, pipeline construction apparatus comprising a platform supporting a first friction welding station, the first friction welding station including first holding means for holding a trailing end of a partially completed pipeline; second holding means for holding an unconnected pipe section, the second holding means being rotatable relatively to the first holding means, and each holding means including a chuck assembly according to the invention; and means for urging the first and second holding means together whereby an unconnected pipe section can be friction welded to a partially completed pipeline.

With this apparatus the pipeline construction process is considerably simplified by making use of the friction welding technique.

In some examples, the pipe sections welded to the pipeline may themselves comprise two subsidiary pipe sections which have been previously welded together at a second welding station on the platform. The subsidiary pipe sections may have been welded together using conventional submerged-arc welding or the friction welding technique.

In most cases, the pipe section will be directly welded to the trailing end of the pipeline but in some cases the pipe section held by the second holding means may comprise an intermediate pipe section of short length while third holding means are provided to hold a further unconnected pipe section. In this way, the intermediate pipe section can be simultaneously welded to the trailing end of the pipeline and an unconnected pipe section.

Preferably, the first friction welding station is movable between a first welding position and a second welding position spaced apart by a distance sufficient to enable two pipe sections to be welded to a partially completed pipeline without requiring movement of the platform relatively to the pipeline.

With this arrangement, in a typical sequence of operations, a forty foot pipe section is loaded into the first friction welding station and is friction welded in a conventional manner to the trailing end of a partially completed pipeline. After welding, the holding mean are released and the welding station is moved along the pipeline to the unconnected end of the latest pipe section and a further pipe section is connected. At this point, the platform is then moved relatively to the pipeline so that a further length of the pipeline is released from the platform and the welding station is moved back to its first position whereupon two further pipe sections can be connected.

It should be understood that the movement of the first welding station is considerably greater than that needed to deal with problems of heave which have already been considered in the past.

Typically, each pipe section will have the same length and so the first and second welding positions will be at a fixed distance apart. However, this arrangement is equally applicable to the construction of pipelines in which the pipe sections have different lengths. Furthermore, although it is preferable for the friction welding station to move between first and second welding positions, it could instead move between more than two friction welding positions. In the latter case, the number of times which the platform would need to move relatively to the pipeline could decrease although each movement would be larger than in the case where only two welding positions were used when two relatively long pipe sections are welded.

A further advantage of this apparatus when a single welding station is provided is that the first friction welding station and any weld testing stations can be arranged in line and symmetrically on the platform thus improving stability of the platform.

Preferably, the apparatus further comprises means for feeding unconnected pipe sections to the first friction welding station.

In one particularly convenient example, the first friction welding station comprises first and second carriages, the carriages being movable relatively to one another, wherein the first carriage supports a trailing end of a pipeline and the second carriage comprises at least two pipe section supporting assemblies movably mounted on a base.

With this arrangement, while one pipe section is being connected to the partially completed pipeline, another pipe section can be loaded onto another supporting assembly and after the first friction welding station has moved to the other friction welding position, the two carriages can be moved apart to enable the other supporting assembly to be brought into contact with the first carriage. This considerably decreases the overall handling and/or manipulating time involved.

Preferably, the supporting assemblies extend radially outwardly of a central pivot mounted on the second carriage about which they can be rotated to a welding position at which they engage the first carriage when the first and second carriages are moved together. Conveniently, six supporting assemblies are provided equally spaced circumferentially about the central pivot.

The holding means may be provided one on each carriage but preferably both holding means are provided on the same carriage and are relatively linearly movable.

Preferably, the first friction welding station is mounted on wheels which run on a pair of rails mounted on the platform. Conveniently, braking means is provided to secure the first friction welding station at each of the first and second welding positions.

Typically, the platform will be provided by the deck of a ship or lay barge for offshore pipe laying and be supported by wheels for onshore pipe laying.

Some examples of lay barges and onshore apparatus having friction welding machines incorporating chuck assemblies in accordance with the invention will now be described with reference to the accompanying drawings, in which:

FIG. 1 is a plan of an example of a lay barge, with some parts omitted for clarity;

FIG. 2 is a side elevation of the example shown in FIG. 1;

FIG. 3 is an enlarged side elevation of the friction welding machine shown in FIGS. 1 and 2;

FIG. 4 is a view similar to FIG. 3 but of an example of onshore friction welding apparatus;

FIG. 7 is an enlarged plan of the first friction welding station shown in FIG. 5;

FIG. 8 is an enlarged side elevation of the first friction welding station shown in FIG. 5;

FIGS. 9A to 9C are cross-sections through three examples of chuck assemblies;

FIG. 10 is an enlarged cross-section of the mandrel shown in FIG. 9;

Figure 5:
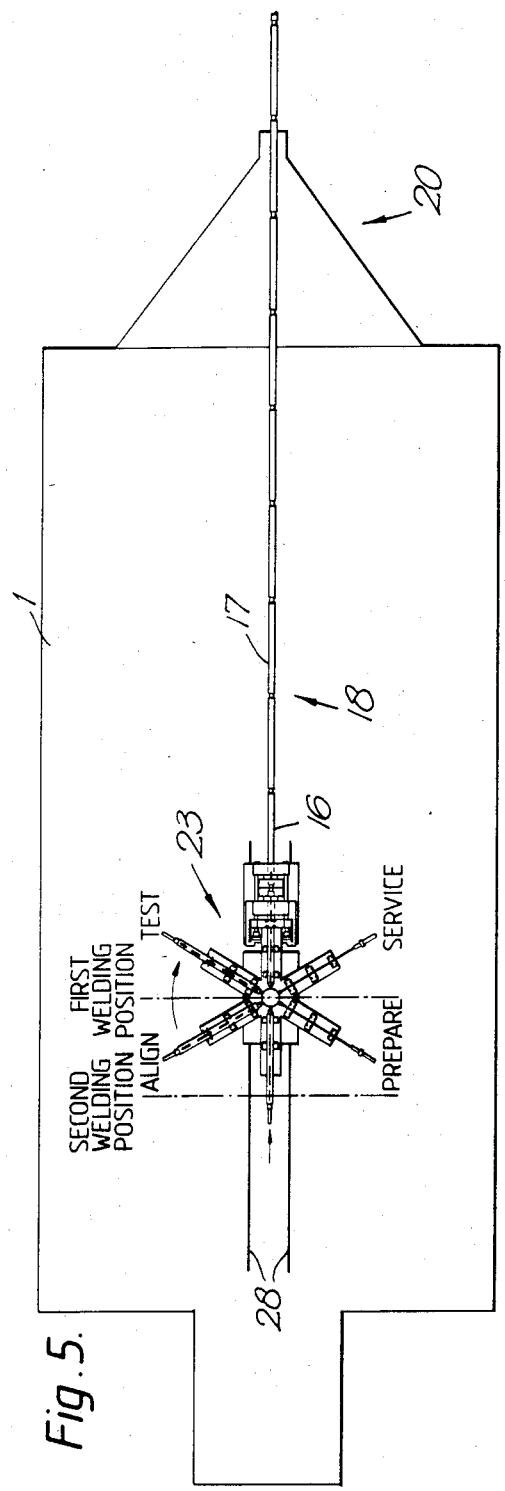
FIGS. 5 and 6 are views similar to FIGS. 1 and 2 respectively but of a second example of a lay barge.
Figure 6:
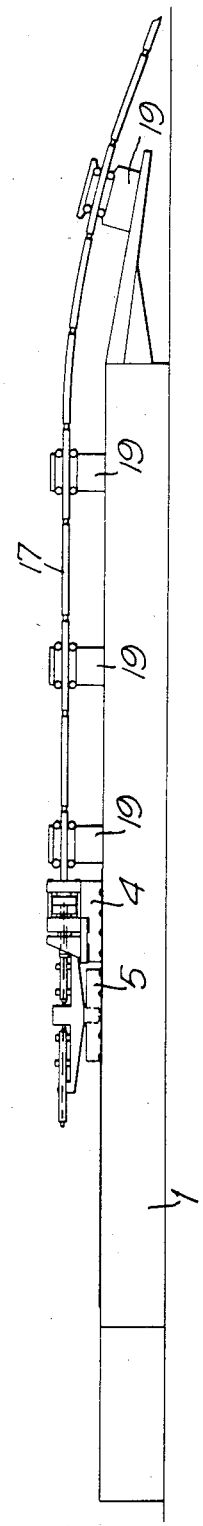

FIGS. 1 and 2 illustrate a lay barge 1 the left hand end, as seen in the drawing, of which is connected to a towing vessel (not shown). A pair of rails 2 (one shown in FIG. 2) are secured to the lay barge 1 and support a first friction welding station 3. The friction welding station 3 comprises a carriage 4 which is mounted on wheels 6 (FIG. 3) so that the carriage can run along the rails 2 to counteract problems of heave. (Typically movement in the order of 4 feet (1.2 meters) may be expected).

The carriage 4 supports a first chuck assembly 7 and a second chuck assembly 8. The carriage 4 also carries a pressure assembly 9 for urging the chuck assembly 8 towards the chuck assembly 7. In addition, the carriage 4 carries four support members 10 for supporting pipe sections as will be explained below.

Also mounted on the lay barge 1 is a second friction welding station 11 which has a similar form to the welding station 3 with chuck assemblies 7', 8' and will therefore not be described in detail.

Initially, concrete clad pipe sections 12 are stored on the lay barge 1 in an area 12' (as shown in FIG. 1) and typically each pipe section 12 may have a length of 40 feet (12 meters) and a diameter of 2 feet (0.6 meters) with a wall thickness of about 1 inch (2.5 cms). A pair of pipe sections 12 is then loaded into the second friction welding station 11 where they are friction welded together to produce an 80 foot pipe section 13. The welding process will be described in more detail in connection with the first welding station 3. Each 80 foot pipe section 13 then undergoes non-destructive testing at an NDT station 14 and acceptable 80 foot sections are stored at a station 15.

A double length section 13 from the station 15 is then mounted on the support members 10 of the first friction welding station 3. One end of the double length section 13 is inserted into the chuck assembly 8 and a mandrel 15a is passed through the double length section 13 into the trailing end 16 of a pipeline 17. The mandrel supports two sets of internal jaws which can be moved radially outwardly under hydraulic pressure to cooperate with corresponding sets of external radially inwardly movable jaws supported by the chuck assemblies 7,8. After actuation, the double length pipe section 13 is firmly secured in the chuck assembly 8 while the trailing end 16 of the pipeline 17 is secured in the chuck assembly 7.

The chuck assemblies of the welding station 3 and of the welding station 11 will be described in more detail below.

In the position shown in FIG. 3, the chuck assembly 8 is then rotated relatively to the chuck assembly 7 in a conventional manner by a motor (not shown) and at a sufficiently high speed while the double length section 13 is urged under hydraulic pressure against the trailing end 16 of the pipeline 17 under the influence of the pressure means 9 so that a considerable amount of heat is built up at the interface. Once sufficient heat is built up, rotation is stopped and the double length section 13 is urged under similar or considerably greater pressure by the pressure means 9 against the trailing end 16 of the pipeline 17. Welding then is complete. Typically, the welding process takes in the order of 1 minute.

After welding has been completed, the lay barge 1 is towed to the left, as seen in FIG. 1, a distance equal to the length of the two pipe sections (80 feet). A new double length section 13 is then mounted in the first welding station 3 and the process repeated.

Downstream of the first welding station 3 is positioned an NDT station 18 of conventional form while the completed pipeline 17 is supported by conventional caterpillar type tensioning units 19. As can be seen in FIGS. 1 and 2, the completed pipeline passes over the lay barge 1 to a conventional stinger system 20 from where the pipeline enters the sea.

FIG. 4 illustrates an onshore welding station 21 which is similar to the first welding station 3 shown in FIG. 3 except that only single length pipe sections 12 are welded to the trailing end 16 of the pipe line 17. Also, it can be seen that the welding station 21 is supported by caterpillar tracks 22 (only one shown in FIG. 4) so that the welding station can be moved across land. In all other respects the welding station is the same as that shown in FIG. 3 and will not be described further.

The example shown in FIGS. 5 to 8 is significantly different from the examples shown in FIGS. 1 to 3 in that a single welding station 23 is provided. In some respects, however, this example is the same as that shown in FIGS. 1 to 3 and so the same reference numerals have been used where appropriate. The major difference between the welding station 23 and the first friction welding station 3 shown in FIG. 1 lies in the provision and construction of a second carriage 5.

The carriage 5 comprises a base 24 rotatably carrying a turntable 25. The turntable 25 has six arms 26 each of which carries three support members 27. The carriages 4, 5 are mounted via the wheels 6 on a pair of rails 28. Mandrels 29 are connected to the center of the turntable 25 and extend along each arm 26.

At the position shown in the drawings, the welding station 23 is positioned at a first welding position and the carriages 4, 5 are adjacent one another so that a 40 foot pipe section 12 supported on an arm 26 is inserted into the chuck assembly 8. The support members 10 allow rotation of the pipe section 12 so that it can be welded to the trailing end 16 of the pipeline 17, as previously described.

After welding, the chuck assemblies 7,8 and the mandrel jaws are released and the carriages 4, 5 move together along the rails 28 until the chuck assembly 7 is located at the trailing end of the recently connected pipe section 12. At this point, the center of the turntable 25 is at the second welding position shown in FIGS. 5 and 7. The second carriage 5 is then moved further along the rails 28 while the first carriage 4 remains stationary so that a mandrel 29 previously located in the pipe section 12 just welded is withdrawn from the pipe section. The turntable 25 is then rotated in a clockwise direction as indicated by an arrow 30 whereupon a new pipe section 12 and mandrel 29 are brought into alignment with the pipeline 17. The carriage 5 is then moved towards the carriage 4 so that the protruding end of the new mandrel 29 enters the trailing end 16 of the pipeline 17 and the new pipe section 12 located in the chuck assembly 8. The friction welding process is then repeated in exactly the same way as in the first welding position.

After this new pipe section 12 has been welded to the trailing end 16 of the pipeline 17, the lay barge 1 is towed to the left as seen in FIG. 5, a distance equal to the length of the two pipe sections 12 just welded (typically 80 feet). The carriage 4 is moved back along the rails 28 to the position shown in FIG. 5. The carriage 5 remains stationary to allow the turntable 25 to be rotated once again in the direction of the arrow 30 so that a further pipe section 12 and mandrel 29 are brought into alignment with the pipeline 17. The carriage 5 is then moved towards the carriage 4 so that the mandrel 29 enters the trailing end 16 of the pipeline 17 and the new pipe section 12 located in the chuck assembly 8. At this point, the apparatus has returned to the position shown in FIG. 5 and the process is repeated. As will be appreciated, the lay barge 1 only has to be moved relatively to the pipeline 17 after two pipe sections have been welded to it and without a preliminary step of welding two 40 foot sections together being required. Of course, if space is available, the rails 28 can be extended to allow more than two pipe sections to be welded together between each movement of the lay barge 1.

FIG. 7 illustrates how at each rotational position of the turntable 25 different actions can be carried out at the positions of the arms 26 not engaging the carriage 4. Thus, at a service station 31 the condition of the mandrel 29 can be checked. At a preparation station 32 the support members 10 are prepared while at a loading station 33 a new pipe section 12 is mounted on the mandrel 29 supported by the respective arm 26 and is supported by the support members 10. At an alignment station 34 the alignment of the pipe section 12 just loaded is checked since where the pipe section 12 has a concrete cladding which is supported by the support members 10, the bore of the pipe section 12 may not be correctly aligned. Finally, a testing station 35 is provided at which the actuation of the internal jaws mounted on the mandrel 29 is tested.

FIGS. 9A-9C illustrate three examples of chuck assemblies 8 (or 8').

FIG. 9A illustrates part of a chuck housing 100 of a specially designed work holding head for a high inertia chuck assembly 8. The chuck assembly 8 comprises a plurality (for example 8) of external jaws 103 equally spaced in an annular configuration around a central bore 104. The radial position of the jaws 103 is controlled by toggle mechanisms 105 mounted to the housing 100 under the influence of an hydraulic cylinder 106.

In use, a metal or plastics pipe, for example a pipe section 13, is inserted into the bore 104 and a mandrel 15a to be described in detail below is inserted into the pipe section 13. The pipe section 13 has a concrete cladding 109.

FIG. 9B is similar to FIG. 9A but illustrates a medium inertia chuck assembly. In this drawing, the same reference numerals have been used to indicate parts similar to those shown in FIG. 9A. As can be seen by comparing FIGS. 9A and 9B the chuck assembly shown in FIG. 9B is smaller than shown in FIG. 9A and uses a slightly different mechanism for causing radial movement of the external jaws 103. In FIG. 9B the housing 100 has a radially inwardly curved cam surface 110. The upper link of each toggle mechanism 5 is replaced by a wheel carriage 111 which moves along the cam surface 110 in response to movement of a rod 112 connected to the respective hydraulic cylinder 106.

FIG. 9C illustrates a low inertia chuck assembly in which a further external jaw actuation system is shown. Once again, the same reference numerals have been used in FIG. 9C as in FIGS. 9A and 9B to illustrate similar parts. In this case, each external jaw 103 is urged in a radially outwardly direction by a compression spring 113 and rotatably carries a wheel 114 which engages a cam 115 connected to the rod 112. The cam 115 engages on its radially outwardly facing surface a rotatable wheel 116 mounted in the housing 100. As the rod 112 is moved to the right in FIG. 9C the external jaw 103 will be urged in a radially inward direction as the wheel 114 runs along the surface of the cam 115. As the piston rod 112 moves to the left in FIG. 9C the external jaw 103 will move radially outwardly under the influence of the compression spring 113.

FIG. 10 illustrates the chuck assemblies 7, 8 of the friction welding station 3 after the pipe section 13 has been friction welded to the pipeline 17. The pipeline 17 has a concrete cladding 118. For clarity, the housings 100 have been omitted in FIG. 10. As can been seen in FIG. 10, the two assemblies 7, 8 provide two sets of external jaws 103, 103' and the jaws 103 are rotatable relatively to the jaws 103'. This relative rotation is achieved by rotatably supporting the housing 100 in an outer housing (not shown) while the jaws 103' are non-rotatably fixed to the outer housing.

The mandrel 15a shown in FIG. 10 is common to both the jaws 103 and the jaws 103' and is integrally formed with a guide rod 119 part of which is shown in FIG. 10.

The mandrel 15a comprises a body portion 120 integral with the guide rod 119 about which is rotatably mounted an internal jaw support 121. The support 121 supports 8 internal jaws 122 whose radial extensions are controlled by respective hydraulic cylinders 123. The axial position of the internal jaw support 121 on the body portion 120 of the mandrel 15a is controlled by hydraulic cylinders 124.

A second set of internal jaws 125 is mounted directly on the body portion 120 and the radial extension of the internal jaws 125 are controlled by hydraulic cylinders 126.

Each internal jaw 122, 125 has a radially inner cam surface 150 which engages respective tapering portions 151, 152 of the support 121 and body portion 120. Piston rods 153 of the cylinders 124, 126 slidingly engage surfaces 154 of the jaws 122, 125.

Each internal jaw 122, 125 has a radially outwardly facing dome 127 while each external jaw 103, 103' has a correspondingly shaped dimple 128.

In use, the pipe section 13 and the trailing end 16 of the pipeline 17 are inserted between the respective sets of external jaws 103, 103' with their adjacent ends abutting. The mandrel 15a is positioned in the pipe section 13 and the trailing end 16 of the pipeline 17 and by use of the guide member 119 the internal jaws 125 are aligned with the external jaws 103'. The hydraulic cylinders 126 are then actuated to cause the internal jaws 125 to move radiallly outwardly while actuating mechanisms (not shown but similar to those shown in FIG. 9C) controlling movement of the jaws 103' are actuated to cause radial inward movement of the jaws 103'. The wall of the pipeline 17 will deflect between each dimple 127 and dome 128 and so is gripped between each pair of jaws 103', 125.

The hydraulic cylinders 124 are then actuated to position the internal jaws 122 in alignment with the external jaws 103 whereupon the hydraulic cylinders 123 are actuated to cause radial outward movement of the jaws 122. At the same time, the hydraulic cylinders 106 are actuated to move the external jaws 103 radially inwardly. The wall of the pipe section 13 is then gripped in a similar manner between each pair of jaws 103, 122.

Figure 11:
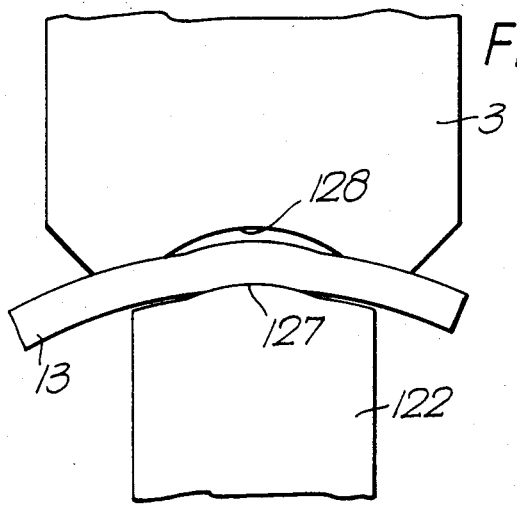
FIG. 11 illustrates in more detail how a pipe is gripped between an internal and an external jaw of a chuck assembly; and, FIG. 12A illustrates graphically the results of tests on jaws of a chuck assembly in accordance with the invention compared with known jaws, FIG. 12B illustrating the test arrangement.

FIG. 11 illustrates in more detail how the wall of a pipe is deflected by each cooperating dome 127 and dimple 128. The size of each dome 127 and dimple 128 is chosen so that the deflection of the pipe wall is within the elastic limits of the pipe material or plastic deformation is within acceptable dimensions. However, it has been found that such a deflection leads to a significant increase in gripping strength.

In an alternative method (not shown), the pipe sections may be preformed with outwardly facing projections (domes) which cooperate with the dimples 127 and domes 128.

Once both pipe section 13 and pipeline trailing end 16 are securely gripped, the housing 100 of the chuck assembly 8 is rotated causing rotation of the internal jaw support 121 and also rotation of the pipe section 13 while the chuck assembly 8 is urged towards the chuck assembly 7. After sufficient heat has been generated, rotation of the housing 100 is stopped while the axial force is maintained or increased. In this way, the pipe section 13 is welded to the trailing end 16 of the pipeline 17. After welding, the mandrel 15a is withdrawn and in order to deal with internal flash 155 the mandrel 15a is provided with an annular shearing element 156 so that withdrawal of the mandrel 15a causes the flash 155 to be sheared away. In addition, the mandrel 15a includes an auxiliary machining head 157 driven by a motor 158.

Figure 12B:
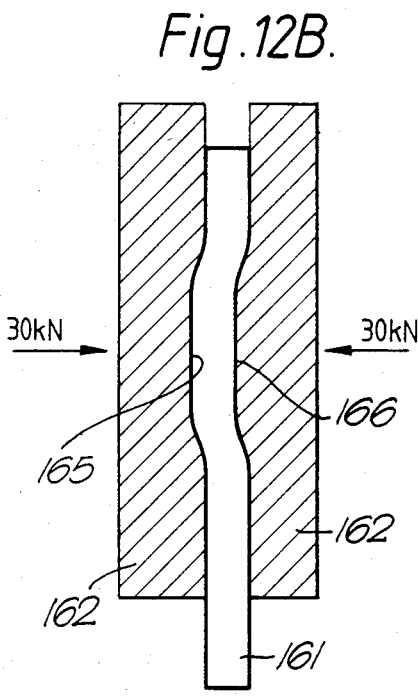
Figure 12A:
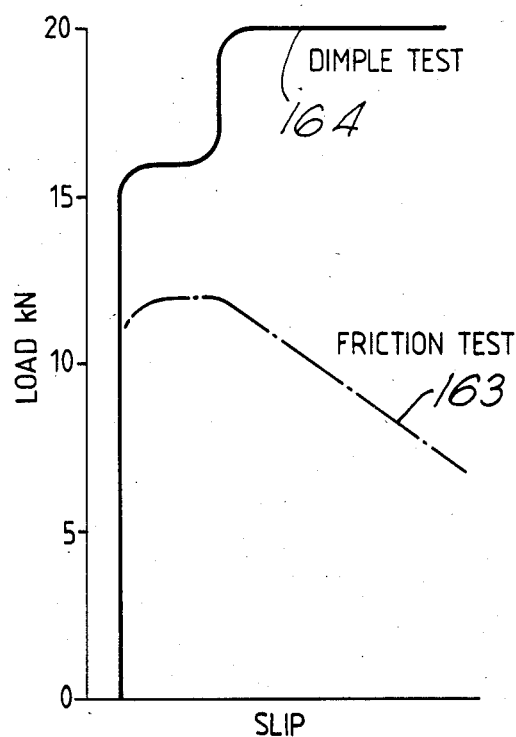

The significant increase in gripping strength achieved by chuck assemblies in accordance with the invention can be seen by reference to FIG. 12A. The graph shown in FIG. 12A illustrates the results of an experiment in which a 3 mm thick metal sheet 161 was positioned between a pair of jaws 162 and a load applied (see FIG. 12B). The jaws were urged together under forces of 30 kN each while a load perpendicular to the gripping direction of the jaws was applied to the sheet 161 varying from 0 to 27 kN.

A line 163 relates to the results obtained for a pair of jaws (not shown) without projections or recesses while a line 164 illustrates the results for the pair of jaws 162 having a cooperating dimple 165 and dome 166. It can be seen that a significantly greater load could be applied to the sheet without significant slippage in the case of a dimple/dome pair of jaws as compared with the other jaws.

I claim:

1. A chuck assembly comprising a plurality of external jaws arranged in an annular configuration; and a corresponding plurality of internal jaws positioned within a pipe in use with the internal and external jaws in alignment, said jaws being adapted to move in a radial direction relatively to one another to grip a pipe wall therebetween, wherein at least one of said internal and external jaws defines a gripping portion comprising one of a projection and a recess adapted to cooperate with a corresponding recess or projection respectively in the wall of a pipe.

2. An assembly according to claim 1, wherein all said internal jaws define gripping portions.

3. An assemby according to claim 1, wherein all said external jaws defines gripping portions.

4. An assembly according to claim 1, wherein said gripping portions comprise projections.

5. An assembly according to claim 1, wherein at least one corresponding pair of said internal and external jaws defines cooperating gripping portions.

6. An assembly according to claim 5, wherein said cooperating gripping portions comprise cooperating projections and recesses.

7. Friction welding apparatus comprising two chuck assemblies arranged in alignment with one another to define an axis and supported by a housing, each chuck assembly comprising a plurality of external jaws arranged in an annular configuration; and a corresponding plurality of internal jaws positioned within a pipe in use with the internal and external jaws in alignment, said jaws being adapted to move in a radial direction relatively to one another to grip a pipe wall therebetween, wherein at least one of said internal and external jaws defines a gripping portion comprising one of a projection and a recess adapted to cooperate with a corresponding recess or projection respectively in the wall of a pipe; and said chuck assemblies being rotatable relatively to one another whereby relative rotation between respective pipes supported by said chuck assemblies is achieved, at least one of said chuck assemblies being axially movable relatively to the other.

8. Friction welding apparatus according to claim 7, wherein said internal jaws of each chuck assembly are supported by mandrels, and wherein each said mandrel supports a plurality of jaw actuating blocks adapted to cooperate with the respective internal jaws and block actuating means, wherein said jaw actuating blocks are adapted to cooperate with said mandrel and said jaws whereby when said blocks are urged along said mandrel by said block actuating means, said blocks cause radial movement of said jaws.

9. Apparatus according to claim 8, wherein said blocks and said respective mandrel define abutting surfaces, said abutting surfaces being correspondingly tapered in said axial direction whereby axial movement of said blocks along said respective mandrel is accompanied by radial movement of said blocks.

10. Apparatus according to claim 8, comprising a common mandrel having relatively rotatable portions, wherein said internal jaws of said chuck assemblies are mounted on respective ones of said portions.

11. Apparatus according to claim 9, comprising a common mandrel having relatively rotatable portions, wherein said internal jaws of said chuck assemblies are mounted on respective ones of said portions.

12. Apparatus according to claim 7, wherein at least one corresponding pair of said internal and external jaws defines cooperating gripping portions.

13. Pipeline construction apparatus comprising a platform supporting a first friction welding station, said first friction welding station including first holding means adapted to hold a trailing end of a partially completed pipeline; second holding means adapted to hold an unconnected pipe section, said second holding means being rotatable relatively to said first holding means, and each said holding means including a chuck assembly comprising a plurality of external jaws arranged in an annular configuration; and a corresponding plurality of internal jaws positioned within a pipe in use with the internal and external jaws in alignment, said jaws being adapted to move in a radial direction relatively to one another to grip a pipe wall therebetween, wherein at least one of said internal and external jaws defines a gripping portion comprising one of a projection and a recess adapted to cooperate with a corresponding recess or projection respectively in the wall of a pipe; and means for urging said first and second holding means together whereby an unconnected pipe section can be friction welded to a partially completed pipeline.

14. Pipeline construction apparatus according to claim 13, wherein said first friction welding station is movable between a first welding position and a second welding position spaced apart by a distance sufficient to enable two pipe sections to be welded to a partially < completed pipeline without requiring movement of said platform relatively to said pipeline.

15. Pipeline construction apparatus according to claim 13, wherein said first friction welding station comprises first and second carriages, said carriages being movable relatively to one another, wherein said first carriage is adapted to support a trailing end of a pipeline and said second carriage comprises at least two pipe section supporting assemblies movably mounted on a base.

16. Pipeline construction apparatus according to claim 14, wherein said first friction welding station comprises first and second carriages, said carriages being movable relatively to one another, wherein said first carriage is adapted to support a trailing end of a pipeline and said second carriage comprises at least two pipe section supporting assemblies movably mounted on a base.

17. Pipeline construction apparatus according to claim 15, wherein said supporting assemblies extend radially outwardly of a central pivot mounted on said second carriage about which they can be rotated to a welding position at which they engage said first carriage when said first and second carriages are moved together.

18. Pipeline construction apparatus according to claim 16, wherein said supporting assemblies extend radially outwardly of a central pivot mounted on said second carriage about which they can be rotated to a welding position at which they engage said first carriage when said first and second carriages are moved together.

* * * * *